United States Patent [19]

Osuna-Diaz et al.

[11] Patent Number: 4,787,836
[45] Date of Patent: Nov. 29, 1988

[54] INJECTION MOLDING NOZZLE

[75] Inventors: Jesus M. Osuna-Diaz, Rochester Hills; Robert D. Ameel, St. Clair, both of Mich.

[73] Assignee: Fairchild Industries, Inc., Chantilly, Va.

[21] Appl. No.: 67,868

[22] Filed: Jun. 30, 1987

[51] Int. Cl.⁴ .................. B29C 45/10; B29C 45/74
[52] U.S. Cl. ................... 425/190; 264/328.15; 425/191; 425/549; 425/568
[58] Field of Search .......... 425/549, 568, 570, 571, 425/564, 191, 190; 264/328.15

[56] References Cited

U.S. PATENT DOCUMENTS 4,266,723  5/1981  Osuna-Diaz ............... 425/549
4,279,588  7/1981  Gellert ..................... 425/568

FOREIGN PATENT DOCUMENTS 2394231  2/1979  France .................. 425/568

Primary Examiner—Jay H. Woo
Assistant Examiner—Timothy W. Heitbrink
Attorney, Agent, or Firm—Michael W. York

[57] ABSTRACT

An injection molding nozzle for use with a flowable molding material in a mold die having an elongated member with a fluid passage extending through it and a cap member having an exit orifice in fluid communication with the fluid passage of the elongated member. A torpedo member is located partially in the fluid passage of the elongated member and the torpedo member has a projection that extends into the exit orifice in the cap member to provide heat to the adjacent flowing molding material when the molding nozzle is in use. The heat provided by this projection on the torpedo member prevents the flowing molding material in the nozzle exit from solidifying and interrupting the molding process.

8 Claims, 1 Drawing Sheet

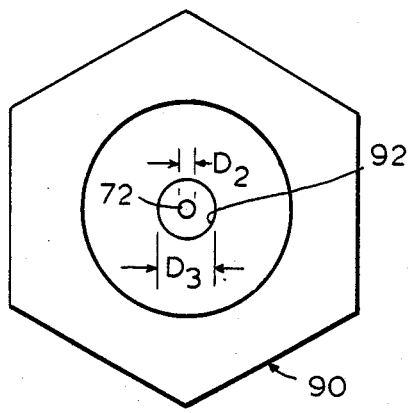
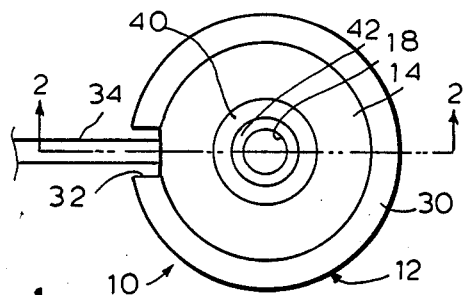
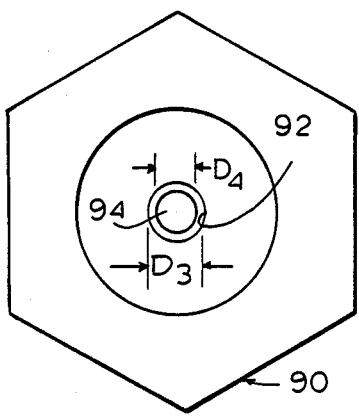
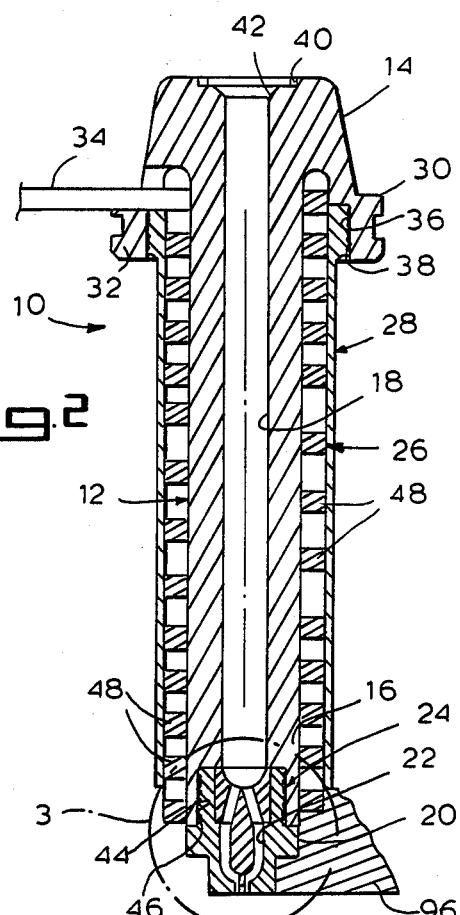
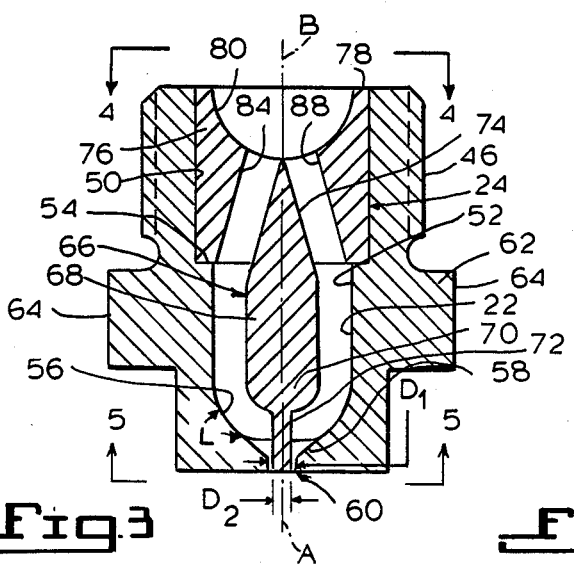
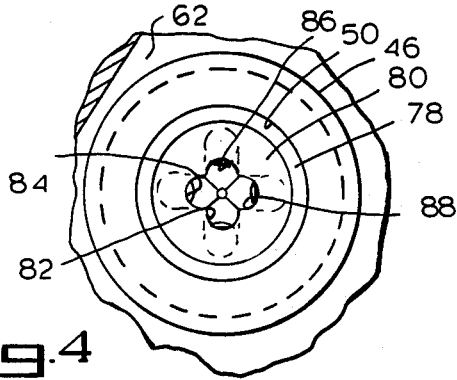

INJECTION MOLDING NOZZLE

BACKGROUND OF THE INVENTION

The desirability of molding products without having a resulting molded product that has a sprue has been known for some time. For instance this permits molding a product in its finished or nearly finished condition so that the sprue that is formed in normal molding does not need to be removed. Consequently, no time needs to be spent on removing the sprue which reduces the labor and time necessary to make the product. In a similar manner the benefits of molding of products without runners has also been known for some time. This permits parts to be molded without the need to remove and separate runners from the products. Again this results in a saving of labor and time in manufacturing the molded product. In addition, the possible waste of molding material associated with the runners has been eliminated.

Unfortunately, a number of problems are possible with runnerless and sprueless molding including drooling, freeze-off, leakage and high maintenance. In order to avoid these and other problems, it is necessary to use injection molding nozzles that are heated and keep the molding material at a proper temperature as it is being injected. Heating itself does not prevent these problems. However, the injection molding nozzle invention solves all of these problems that have been present with past molding nozzles.

This injection molding nozzle permits rapid and efficient runnerless and sprueless molding operations by properly controlling the temperature of the molten material being injected through the nozzle during the molding operation. This temperature control is aided by the unique design of the interior of the nozzle that results in the formation of an insulating barrier of material within the nozzle. The injection molding nozzle also permits the exit orifice size to be readily changed and it is also possible to increase the exit hole size but keep the same exit area that is not possible with current molding nozzles.

BRIEF DESCRIPTION OF THE INVENTION

This invention relates to injection molding nozzles and more particularly to injection molding nozzles that are particularly useful for runnerless or sprueless molding.

It is accordingly an object of the invention to provide an injection molding nozzle that is effective in accomplishing sprueless or runnerless molding.

It is also an object of the invention to provide a high performance injection molding nozzle.

It is also an object of the invention to provide an injection molding nozzle that maintains the molding material at a proper temperature during molding operations.

It is an object of the invention to provide an injection molding nozzle that forms an insulating layer of molding material to assist in maintaining the molding material at the proper temperature during molding operations.

It is an object of the invention to provide an injection molding nozzle that has the capability of having its exit size readily varied.

It is an object of the invention to provide an injection molding nozzle whose exit size is easily changed by replacing a removable portion.

It is a further object of the invention to provide an injection molding nozzle in which it is possible to change the size of the nozzle exit without changing the area of the exit.

It is a further object of the invention to provide an injection molding nozzle in which it is possible to change the area of the nozzle exit but keep the exit size the same.

It is an object of the invention to provide an injection molding nozzle in which it is possible to substitute a portion of the nozzle that is made from one material with a substantially similar portion that is made from another material.

These and other objects are provided by the injection molding nozzle invention for use with a flowable molding material in a mold die that includes an elongated member having an inner and an outer end portion and a material passage therethrough from the inner to the outer end portion, a cap having a passage therethrough removably mounted on the outer end portion of the elongated member and a torpedo or elongated shaped member located at least partially within the cap. The cap interior is sized and shaped to assist in controlling the flow of the molding material.

BRIEF DESCRIPTION OF THE DRAWINGS

The invention will be hereinafter more fully described with reference to the accompanying drawings in which:

FIG. 1 is a top plan view of the injection molding nozzle invention;

FIG. 2 is a sectional view of the molding nozzle illustrated in FIG. 1 taken on the line 2—2 thereof;

FIG. 3 is an enlarged view of a portion of the structure illustrated in FIG. 2 taken within the circle 3 thereof;

FIG. 4 is an end view of a portion of the molding nozzle illustrated in FIG. 3 taken in the direction of the line 4—4 thereof;

FIG. 5 is an end view of an alternative portion of the molding nozzle portion illustrated in FIG. 3 taken in the direction of the line 5—5 thereof; and FIG. 6 is an alternative end view for the end view portion illustrated in FIG. 5.

DETAILED DESCRIPTION OF THE PREFERRED EMBODIMENT

Referring first to FIGS. 1 and 2, the injection molding nozzle invention is illustrated and is designated generally by the number 10. The injection molding nozzle 10 comprises an elongated generally cylindrical shaped body member 12 that has a rear or head end portion 14 and a forward end portion 16 with a generally circular cross section hole 18 extending therethrough from the rear end portion to the forward end portion, and a cap member 20 removably mounted on the forward end portion of the body member. The cap member 20 has an aperture or passage 22 extending through it and the injection molding nozzle 10 also comprises a torpedo member insert 24 located within the cap member 20. The injection molding nozzle 10 also includes a heater 26 that surrounds a substantial portion of the body member 12 and a generally cylindrical shaped housing member 28 that surrounds a substantial portion of the heater 26 and is connected to the body member 12.

The head portion 14 of the body member 12 is larger in diameter than the rest of the body member 12 and its outer portion is shaped like a truncated cone. A circular rim or ring 30 is located around the outside of the inner portion of the head portion 14. This rim 30 has a slot 32 extending through it that permits the heater leads 34 to extend outward through the slot 32 and from the molding nozzle 10. The rim 30 has an interior threaded circular aperture 36 that is sized and threaded to receive the threaded end portion 38 of the housing member 28. The opening to the fluid mold material passage or hole 18 that is located in the head portion 14 has a countersink 40 around it and an inward tapering entrance portion 42 and the opposite end of the hole 18 opens into an enlarged circular cross section threaded hole 44 that is sized and threaded to receive the inner threaded cylindrical portion 46 of the cap member 20.

The heater 26 is conventional in nature and it has a series of heater coils 48 that surround a substantial portion of the body member 12. In addition to surrounding the body member 12, it should be noted that a portion of the heater coils 48 surround the cylindrical threaded portion 46 of the cap member 20 that is located in the threaded aperture 44 of the body member 20. The heater coils 48 are connected to the heater leads 34 that extend outward from the head portion 14.

The cap member 20 is best illustrated in FIGS. 3 and 4 where it can be seen that the threaded cylindrical portion 46 of the cap member has a large centrally located circular shaped cross section hole 50. This hole 50 is connected to a smaller centrally located circular shaped cross section hole 52. A ridge or seat 54 is formed at the juncture of the larger and smaller holes 50 and 52. The end of the hole 52 opposite the seat 54 end terminates in a centrally located dished or substantially spherical shaped portion 56 that terminates into a funnel shaped portion 58 that leads into a circular shaped cross sectioned cylindrical exit orifice 60. The holes 50, 52 and the orifice 60 all form the passage 22 through the cap member 20. To assist in threading the threaded portion 46 into the aperture 44, the cap member 20 is provided with an outward extending tool engaging portion 62 with the flat surfaces 64 that are adapted to be engaged by a suitable tool such as a wrench or the like (not shown) to cause the cap member 20 to be rotated about its long axis.

The details of the torpedo member insert 24 are also best illustrated in FIGS. 3 and 4 where the torpedo member insert 24 is illustrated in place within the cap member 20. The torpedo member insert 24 comprises an elongated generally torpedo shaped member 66 that has a generally cylindrical shaped central portion 68 whose forward end is connected to a substantially spherical shaped forward portion 70 that is located near the exit orifice 60. A substantially circular cross section cylindrical projection 72 extends outward from the spherical shaped surface portion 70 and into the central portion of the exit orifice 60. The opposite end or the rear end of the torpedo shaped member 66 comprises a tapering end portion 74. The tapering end portion 74 is connected to and partially formed from an enlarged substantially circular shaped cross section cylindrical portion 76 whose exterior is sized and shaped so as to be a tight slip fit in the hole 50 of the cap member 20.

The outer surface 78 of the cylindrical portion 76 has a centrally located substantially spherical shaped depression 80 located in it whose diameter is substantially the same as the diameter of the aperture 18 in the body member 12. Four substantially identically sized holes 82, 84, 86 and 88 extend inward and outward from the bottom portion of the depression 80 and extend around and form part of the tapering end portion 74 of the torpedo member 66. These holes 82, 84, 86 and 88 permit passage of the fluid molding material (not shown) from the depression 80 through the holes 82, 84, 86 and 88 around the torpedo member 66 and into the hole 52 and the exit orifice 60. In view of the construction of the torpedo member insert 24 and the cap member 20 the long central axis of the torpedo member 66, including the long axis of the projection 72, designated by the letter A substantially coincides with the long central axis of the cap member 20 designated by the letter B. Consequently, the fluid molding material leaving the exit orifice 60 passes through the ring shaped exit aperture represented by the diameter $D_1$, of the orifice 60 and the diameter $D_2$ of projection 72.

FIGS. 5 and 6 illustrate how the fluid exit from the molding nozzle 10 can be varied by changing one or both of the diameters $D_1$ and $D_2$ set forth in FIG. 3. In FIG. 5 it will be noted that the cap member 20 illustrated in FIG. 3 has been replaced by a substantially similar cap member that is designated by the number 90. This cap member 90 has an exit orifice 92 that replaces the exit orifice 60 of the cap member 20. This exit orifice has a diameter represented by the letter $D_3$ that is substantially greater than the diameter $D_1$ of the orifice 60. However, in FIG. 5 the same projection 72 is retained with its same diameter $D_2$. As a consequence, the exit area of the cap member 90 is substantially greater than the same area illustrated by the cap member 20 of FIG. 3. This increased area is obtained for the injection molding nozzle 10 by merely adding the new cap member 90 set forth in FIG. 5.

In FIG. 6 it will be noted that the same cap member 90 is set forth with its exit orifice that has the diameter $D_3$. However, in this case not only was the cap member 20 replaced by the cap member 90, but also the torpedo member insert 24 has been replaced by a new torpedo member insert that is substantially identical to the torpedo member insert but has a new circular cross section shaped projection 94. As illustrated in FIG. 6, the diameter $D_4$ of this projection 94 is greater than the diameter $D_2$ of the projection 72 illustrated in FIG. 3. As a result of the proper selection of the larger diameters $D_3$ and $D_4$ for $D_1$ and $D_2$ the diameters $D_3$ and $D_4$ are increased, but the exit area is the same as that for the diameters $D_1$ and $D_2$ that are illustrated in FIG. 3.

The injection molding nozzle 10 is made and used in the following manner. In order to make the body member 12 it is machined in a conventional manner from a suitable steel which in the preferred embodiment is SAE 4140 or 4150. The housing member 28 is also machined in a conventional manner from a suitable steel tubular stock that in the preferred emboiment is SAE 1020 seamless mechanical tubing, and then it is finished by grinding. The cap member 20 is machined in a conventional manner from a suitable steel that is SAE 4140 or 4150 steel in the preferred embodiment. The cap member 20 is then in the preferred embodiment plated with nickel through the electroless nickel plating process to give it hardness and reduce wear particularly during molding operations with a mold material that incorporates fiberglass or a mineral powder. In the preferred embodiment the torpedo member insert 24 is machined in a conventional manner from SAE 660 bronze and then finished by being electroless nickle plated to 0.002 to 0.004 inches thick. The heater 26 is available commercially and hence, need not be manufactured.

To assemble the injection molding nozzle 10, the threaded end portion 38 of the housing member is threaded into the threaded aperture 36 in the head portion 14 of the body member 12 after the coils 48 of the heater 26 have been located in place around the body member as illustrated in FIG. 2. This results in the heater 26 being secured in place with the heater leads 34 extending outward from the head portion 14. The torpedo member insert 24 is then slipped into the cap member 20 and the threaded portion 48 of the cap member 20 is screwed into place within the threaded aperture 44 in the body member 12. This is accomplished through the application of force to the flat surfaces 64 through the use of a wrench or the like (not shown). The assembled injection molding nozzle 10 is then ready for use.

The injection molding nozzle 10 is used in a conventional manner by inserting it into a mold die that is represented by the number 96 in FIG. 2 and the heater leads 34 are connected in a conventional manner. The fluid molding material (not shown) is then fed in a conventional manner into the passage 18 in the body member 12. This mold material then flows into the depression 80 through the holes 82, 84, 86 and 88 around the torpedo member 66 and between the projection 72 and the wall of the exit orifice 60. For reasons that are not clear, an insulating layer forms in the area near the exit orifice 60 designated by the letter L. This layer in the area L prevents heat from leaving the molding material and passing into the surrounding mold die 96 that acts as a heat sink. This layer is important since otherwise the nozzle exit 60 could become clogged with solid molding material.

This injection molding nozzle 10 can be used with a wide variety of molding materials including nylon, polyesters, polycarbonates, etc. If the injection molding nozzle 10 is to be used with a highly abrasive molding material such as that containing a fiberglass or mineral powder, then the cap member such as the member 20 should be replaced such as by the cap member 90 that is harder and hence, less likely to wear. Wear that occurs such as to the orifice 60 can be compensated for by changing to a new torpedo member insert 24 that has an increased diameter projection 94 as set forth in FIG. 6. This results in the same exit area even though there is wear.

The function of the torpedo member 66 and its projection 72 is critical to the proper functioning of the injection molding nozzle 10 during molding operations. In this connection, during molding operations, heat passes from the coils 48 of the heater 26, through the forward end portion 16 of the body member 12, through the projection portion 76 of the torpedo member insert 24, through the torpedo shaped member 66 and the cylindrical projection 72. The heat in the torpedo shaped member 66 and the projection 72 passes outward into the flowing molding material to keep it from solidifying. This is particularly important with the projection 72, since the heat flowing outward from the projection 72 prevents the flowing material from becoming solid and clogging the exit orifice 60 in the cap member 20.

It should be noted that in view of the construction of the apertures 60 and 92 and the associated projections 72 and 94, the junction of the molding material between the exit of the injection molding nozzle 10 and the part being molded during molding operations has an annular shaped hollow cross section instead of the usual solid cross section. This makes it easier to separate the molded part from the molding nozzle 10 and results in a molded part that has a smoother surface at the nozzle 10 exit location.

Although the invention has been described in considerable detail with reference to certain preferred embodiments, it will be understood that variations or modifications may be made within the spirit and scope of the invention as defined in the appended claims.

What is claimed is:

1. An injection molding nozzle for use with a flowable molding material in a mold die comprising an elongated member having an input and an output end portion and a material passage therethrough from the input to the output end portion, a cap having a passage therethrough with an exit orifice removably mounted on the output end portion of said elongated member, a heater surrounding at least a portion of said elongated member and a removable torpedo member located within said cap, said removable torpedo member having a substantially cylindrical projection, said substantially cylindrical projection extending into the exit orifice in said cap whereby the junction of the molding material between the exit orifice and a part being molded has an annular shaped hollow cross section.

2. The injection molding nozzle of claim 1 wherein the substantially cylindrical projection of said torpedo member has a substantially circular cross section.

3. The injection molding nozzle of claim 2 wherein the exit orifice in said cap has substantially a cylindrical shape.

4. The injection molding nozzle of claim 1 further comprising a substantially spherical shaped portion in the passage of said cap.

5. The injection molding nozzle of claim 4 further comprising a funnel shaped portion leading into said exit orifice at the termination of said substantially spherical shaped portion in the passage of said cap.

6. The injection molding nozzle of claim 4 wherein said torpedo member has a substantially spherical shaped portion and said substantially cylindrical shaped projection is connected to the substantially spherical shaped portion.

7. The injection molding nozzle of claim 1 further comprising a second torpedo member having a different sized substantially cylindrical projection than said first torpedo member, said second torpedo member being adapted to replace said first torpedo member.

8. The injection molding nozzle of claim 7 further comprising a second cap having a different sized exit orifice than said first cap, said second cap being adapted to replace said first cap.

* * * * *